US012797855B2

(12) United States Patent
Sng

(10) Patent No.: US 12,797,855 B2
(45) Date of Patent: Nov. 17, 2026

(54) HEATED WELL PLATE

(71) Applicant: DH Technologies Development Pte. Ltd., Singapore (SG)

(72) Inventor: Wayne Wei Kang Sng, Singapore (SG)

(73) Assignee: DH Technologies Development Pte. Ltd., Singapore (SG)

( * ) Notice: Subject to any disclaimer, the term of this patent is extended or adjusted under 35 U.S.C. 154(b) by 593 days.

(21) Appl. No.: 18/550,717

(22) PCT Filed: Mar. 17, 2022

(86) PCT No.: PCT/IB2022/052436
§ 371 (c)(1),
(2) Date: Sep. 15, 2023

(87) PCT Pub. No.: WO2022/195533
PCT Pub. Date: Sep. 22, 2022

(65) Prior Publication Data

US 2024/0181461 A1 Jun. 6, 2024

Related U.S. Application Data

(60) Provisional application No. 63/162,345, filed on Mar. 17, 2021.

(51) Int. Cl.
*B01L 7/00* (2006.01)

(52) U.S. Cl.
CPC ......... *B01L 7/00* (2013.01); *B01L 2300/0829* (2013.01); *B01L 2300/1827* (2013.01)

(58) Field of Classification Search
CPC ...... B01L 7/52; B01L 7/54; B01L 2300/1822; B01L 2300/0829; B01L 2300/1844; B01L 3/50851; G05D 23/193
See application file for complete search history.

(56) References Cited

U.S. PATENT DOCUMENTS 6,018,388 A 1/2000 Nawracala et al.
6,940,055 B2 9/2005 Kwasnoski et al.
2002/0070208 A1 6/2002 Kwasnoki et al.
2004/0033619 A1* 2/2004 Weinfield ............ B01L 3/50255 210/321.75

(Continued)

FOREIGN PATENT DOCUMENTS

CN 112136205 A 12/2020
EP 3106510 12/2016

(Continued)

OTHER PUBLICATIONS

Machine Translation of Karubuin et al (JP 06-238884) performed on Apr. 30, 2026 (Year: 1994).*

(Continued)

*Primary Examiner* — Brian W Jennison

(57) ABSTRACT

A well plate includes a body including a plurality of well walls and an outer wall. A glass plate is disposed below the plurality of well walls so as to form a bottom of each of a plurality of wells defined by the plurality of well walls. A plurality of electrical heat trace wires are disposed on the glass plate. A plurality of contacts are disposed proximate an exterior surface of the body. A plurality of conductors connect the plurality of contacts to the plurality of heat trace wires.

20 Claims, 4 Drawing Sheets

(56) References Cited

U.S. PATENT DOCUMENTS

| | | | | |
|---|---|---|---|---|
| 2009/0104081 | A1 | 4/2009 | Vollert | |
| 2019/0262829 | A1* | 8/2019 | Umapathi | B01L 3/502715 |

FOREIGN PATENT DOCUMENTS

| | | | |
|---|---|---|---|
| JP | H06-238884 | A | 8/1994 |
| WO | 01/08800 | | 2/2001 |

OTHER PUBLICATIONS

PCT International Search Report and Written Opinion in Application PCT/IB2022/052436, mailed Jul. 22, 2022, 17 pages.
PCT International Preliminary Report on Patentability in Application PCT/IB2022/052436, mailed Sep. 28, 2023, 12 pages.

* cited by examiner

HEATED WELL PLATE

CROSS-REFERENCE TO RELATED APPLICATION

This application is a National Stage Application of PCT/IB2022/052436, filed on Mar. 17, 2022, which claims the benefit of U.S. Provisional Application No. 63/162,345, filed on Mar. 17, 2021, the entire disclosures of which are incorporated herein by reference in their entireties. To the extent appropriate, a claim of priority is made to each of the above disclosed applications.

BACKGROUND

A well plate (also referred to as a well tray, microplate, microtiter plate, microwell plate, multiwell, etc.) is a flat plate with multiple "wells" used as small test tubes. The well plate has become a standard tool in analytical research and clinical diagnostic testing laboratories. A well plate typically has 6, 12, 24, 48, 96, 384 or 1536 sample wells arranged, e.g., in a 2:3 rectangular matrix. Each well of a well plate typically holds between tens of nanolitres to several millilitres of liquid samples. They can also be used to store dry powder or as racks to support glass tube inserts. Wells can be either circular or square, with flat or sloped bottoms. For compound storage applications, square wells with close fitting silicone cap-mats are preferred. Well plates can be stored at low temperatures for long periods, may be heated to increase the rate of solvent evaporation from their wells and can even be heat-sealed with foil or clear film. Samples may be drawn from the well plate via one or more pipettes, or may be ejected via non-contact droplet dispensing, such as acoustic droplet ejection (ΔDE).

SUMMARY

In one aspect, the technology relates to a well plate including: a body including a plurality of well walls and an outer wall; a glass plate disposed below the plurality of well walls so as to form a bottom of each of a plurality of wells defined by the plurality of well walls; a plurality of electrical heat trace wires disposed on the glass plate; a plurality of contacts disposed proximate an exterior surface of the body; and a plurality of conductors connecting the plurality of contacts to the plurality of heat trace wires. In an example, the outer wall includes a rim. In another example, at least one of the plurality of electrical trace wires are aligned with at least one of the plurality of well walls. In yet another example, at least a portion of each of the plurality of conductors are embedded in the body. In still another example, each of the plurality of contacts are disposed substantially flush with the body.

In another example of the above aspect, each of the plurality of contacts are recessed within the body. In an example, the plurality of contacts are disposed on the outer wall. In another example, the plurality of contacts are disposed on the rim. In yet another example, the wall plate further includes a fuse coupled to the plurality of conductors. In still another example, a bottom surface of the glass plate is elevated relative to a bottom surface of the outer wall.

In another aspect, the technology relates to a well plate including: a molded plastic body defining an outer wall of the well plate and a plurality of well walls, wherein the plurality of well walls define a plurality of sample wells; an acoustically transparent plate defining a bottom of each of the plurality of sample wells; a plurality of electrical trace wires embedded within the plate; a plurality of conductors connected to the plurality of electrical trace wires; and a contact connected to each of the plurality of conductors. In an example, the contacts are accessibly disposed on an exterior surface of the molded plastic body. In another example, the contacts are disposed on substantially opposite exterior surfaces of the molded plastic body. In yet another example, the plurality of conductors are at least partially embedded in the molded plastic body. In still another example, the plurality of trace wires are disposed substantially parallel to each other.

In another example of the above aspect, the plurality of trace wires are disposed substantially parallel to the outer wall of the molded plastic body. In an example, the molded plastic body is directly secured to the acoustically transparent plate. In another example, the molded plastic body is adhesively secured to the acoustically transparent plate. In yet another example, the plurality of electrical trace wires are substantially aligned with at least one of the plurality of well walls. In still another example, the plurality of conductors are embedded in a bridge spanning from the outer wall to the acoustically transparent plate.

DETAILED DESCRIPTION

Uses of well plates are well known in the art. In examples, liquid samples containing one or more compounds are placed in the wells of the well plate and one or more analytes may be introduced to the sample. After a reaction between the compounds and the analytes, the resulting liquid may be removed from of the wells, e.g., for further processing or other testing. Some reactions require the sample to be maintained at a temperature elevated relative to the ambient. While the well plates may be placed in a heated environment (e.g., on a heated support or in a heated chamber), it is often required to maintain this elevated temperature at all stages of processing (e.g., during storage, during movement of the well plate to an analyzer, during removal of the samples from each well, etc.). This need for maintaining an elevated temperature of the samples may be easier during storage, when the well plate may be placed in an incubator or other environment having an elevated temperature. However, well plates are made primarily of molded plastic, which often does not retain heat during transport, sample removal, or other procedures when it is removed from the higher temperature environment. Well plates that are utilized in contactless ejection systems (e.g., ADE) present additional challenges, in that the bottom of each well must be acoustically transparent, so as to not interfere with the sound energy that ejects the sample droplets into an analyzer.

Thus, the technologies described herein include well plates that incorporate an on-board heating system that may maintain an elevated temperature of the wells (and samples therein) at various stages of processing. Such technologies incorporate electrical contacts on accessible portions of the well plate, so that electrical power to the heating elements may be maintained during storage, transport, sampling, and other processes. Conductors extending from the contacts to the heating elements may be embedded in structural elements of the well plate, or in other features that protect the conductors from damage during use, movement, etc. Further, the heating elements may be arranged in discrete areas (e.g., on or in the glass plate that forms the bottom surface of the wells), so as to not interfere with acoustic ejection functions. Other advantages of incorporating heating elements into well plates will be apparent to a person of skill in the art upon reading the full disclosure below.

Figure 1:
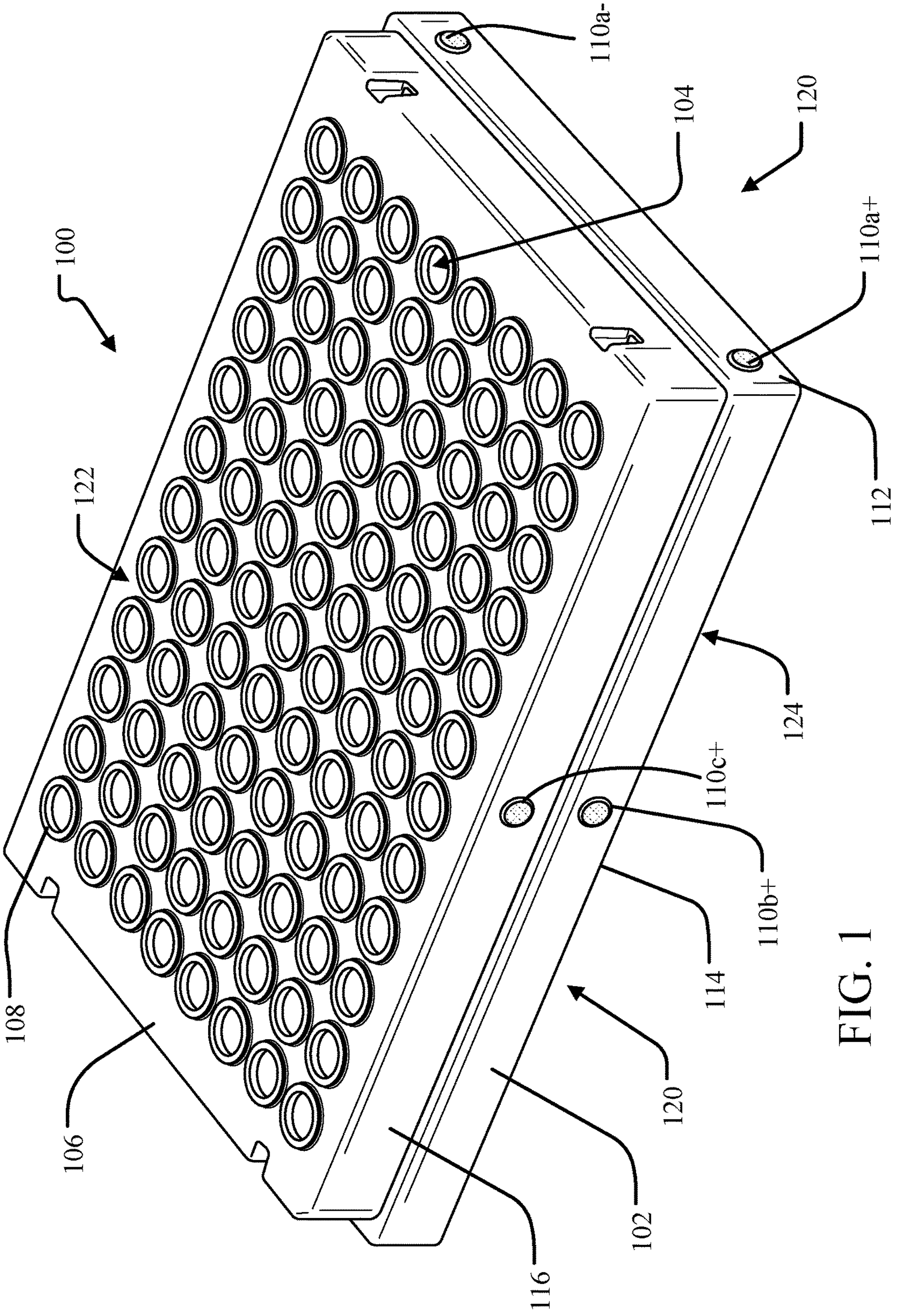
FIG. 1 depicts a perspective view of an example of a well plate.

FIG. 1 is a perspective view of an example well plate 100. The well plate 100 includes a base or rim 102 and a plurality of wells 104 arranged in a number of rows (identified as A-H) and columns (identified as 1-12). In examples, the wells 104 may be integrally formed with a body 106 that surrounds the plurality of wells 104, and the body 106 may be integrally formed with the base or rim 102. The base 102 may also be referred to as a skirt and may have outer dimensions generally similar to, or wider than, those of the body 106. In general, the wells 104 may have an open mouth defined by an outer raised rim 108 and may be generally cylindrical or conical in shape. In other examples, the walls of the wells 104 may be straight and the base of each well 104 may be curved, concave, or flat. Different configurations and form factors of wells 104 are known in the art; particular configurations or form factors are not necessarily relevant to the present technology. However, when used in contactless ejection applications, it may be desirable that the base of each well 104 may be flat, as described in more detail herein. As used herein, the base or rim 102 is the portion of the well plate 100 proximate the base of each well 104.

The well plate 100 may include one or more contacts 110 disposed on various exposed surfaces thereof. In FIG. 1, side surface 114 and end surface 112 of the base or rim 102 are depicted for illustrative purposes, as are side surface 116 and end surface 118 of the body 106. Typically, two contacts 110 are utilized (e.g., one defining a positive terminal and one defining a negative terminal). The contacts 110 may be disposed on any exposed surface as required or desired for a particular application, although a number of specific examples are depicted and described here for illustrative purposes. It may be advantageous, however, to dispose the contacts 110 on the outer wall 120, upper surface 122, or lower surface 124 of the well plate 100. The outer wall 120 corresponds generally to the portion of the body 106 outside the area containing the wells 104, and surrounds said wells 104. In one example, the outer wall 120 on a single side of the well plate 100 includes side surface 114 of the rim 102, as well as side surface 116 of the body 106. In another example, the outer wall 120 on a single end of the well plate 100 includes end surface 116 of the rim 102, as well as end surface 118 of the body 106. Outer walls corresponding to the remaining side and end of the well plate 100 may be defined similarly.

In a first example of a contact location, a positive contact 110*a*+ may be disposed proximate one end of the end surface 112 of the rim 102, while a negative contact 110*a*− may be disposed proximate the opposite end of the end surface 112. Such a configuration, with contacts 110*a* disposed low on the rim 102, may be advantageous for making contact with corresponding terminals on an alignment feature within a storage element, stage (e.g., as used in conjunction with an ADE system), or other system component. Although the contacts 110*a*+ and 110*a*− are depicted on opposite ends of the end surface 112, they may be disposed closer to each other, as required or desired for a particular application.

It may also be advantageous to dispose contacts on opposite outer walls of the well plate 100. Such an example is depicted in part with a positive contact 110*b*+ disposed on the side surface 114 of the rim 102. A corresponding negative contact is disposed on a side surface of the rim 102 opposite that of side surface 114. In another example, a positive contact 110*c*+ is disposed on the side surface 116 of the body 106, with a corresponding negative contact disposed on a side surface of the body 106 opposite that of side surface 116. In the case of positive contacts 110*b*+ and 110*c*+ it may be desirable that their corresponding negative contacts (not visible in FIG. 1) are disposed diametrically opposite on the rim 102 or body 106, respectively. Opposing contacts allow a tool (e.g., in the form of a gripper) to lift and move the well plate 100 evenly. Corresponding contacts may be disposed in the tines of the grippers to energize the heating elements within the well plate, even during movement of the well plate 100. Other locations of contacts 110 are contemplated, e,g., on the upper surface 122 or lower surface 124 of the well plate 100. The contacts 110 may be surface mounted on or recessed within the well plate 100. Recessed contacts 110 may be particularly advantageous to avoid inadvertent contact with other components that might damage the contacts.

Figure 2:
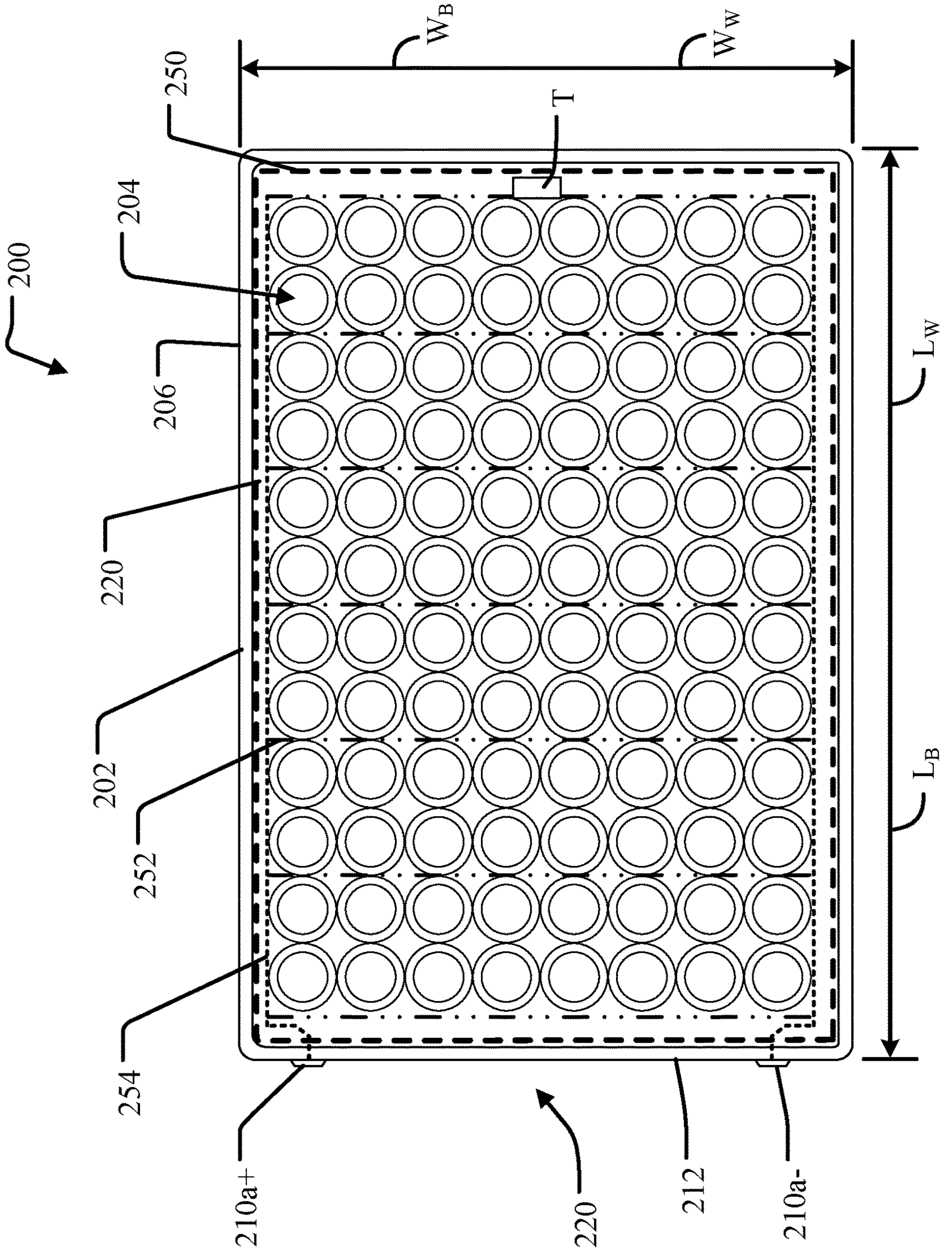
FIG. 2 depicts a top view of another example of a well plate.

FIG. 2 depicts a top view of another example of a well plate 200. In this example, the dimensions of the base or rim 202 are generally contiguous with those of the body 206, thus providing outer walls 220 of a consistent dimension from top to bottom. That is, the length $L_B$ of the base 202 as generally the same as the length $L_W$ of the body 206 defining the wells 204, and the width $W_B$ of the base 202 as generally the same as the width $W_W$ of the body 206 defining the wells 204. Of course, bases having dimensions different than those of the body are also contemplated, for example, as depicted in the example depicted above in FIG. 1. Two contacts 210*a*+ and 210*a*− are disposed on the end surface 212 of the outer wall 220. A glass plate 250 forming the base of each well 204 is disposed within the well plate 200 (and thus depicted as dashed lines). The glass plate 250 includes embedded therein one or more electrical heat trace wires 252 (depicted in dashed line) that, in this example, extend substantially parallel to the width dimension of the well plate 200. The electrical heat trace wires 252 are substantially aligned with the walls that separate adjacent wells 204 and are connected to the contacts 210*a* via a plurality of conductors 254 (also depicted in dashed line). Such walls may be substantially vertical solid structures that define a well 204 on opposites sides thereof. In other examples, the walls may be gaps between discrete cylindrical walls that form each of the plurality of wells 204. Regardless, by disposing the electrical heat trace wires 252 substantially aligned with the walls, the heat trace wires do not adversely affect the acoustic transparency of the glass plate 250, thus ensuring proper non-contact ejection of droplets (e.g., via ADE).

The heat trace wires 252 may be dispersed evenly within the glass plate 250 and need not be arranged below every wall. For example, the well plate 200 depicted in FIG. 2 includes a heat trace wire 252 below every other wall along the width of the well plate 200. Other examples contemplate greater or lesser spacing. In other examples, the heat trace wire may be disposed substantially orthogonal to the width dimension, while FIG. 2 depicts the heat trace wires substantially parallel thereto. Further, while the electrical trace wires 252 are depicted substantially straight, any other orientation is contemplated (e.g., arranged non-parallel to both the length and width dimensions, arranged in a crossing or checkboard pattern, arranged in a curvilinear pattern). In general, any pattern that arranges the heat trace wires generally below the walls may be utilized.

In examples, the temperature control range on the glass plate 250 may be about 5° C. above ambient to about 50° C. above ambient. The temperature may be incrementally consistent within about 0.1° C. throughout the glass plate 250 due to the thermal conductivity of the glass material. This can maintain a temperature stability of ±0.3° C. on specimen, which will allow a researcher to perform time-lapse experiments accurately and safely over long time periods. An integrated temperature sensor "T" ensures even, consistent thermal conductivity over the entire plate 250 to prevent temperature drops. The sensor may also be configured to act as a thermal fuse to prevent overheating. In addition to being acoustically transparent, the glass plate 250 may be anti-scratch, anti-fingerprint, and chemically-resistant. Glass thickness of about 0.5 mm is contemplated.

Figure 3:
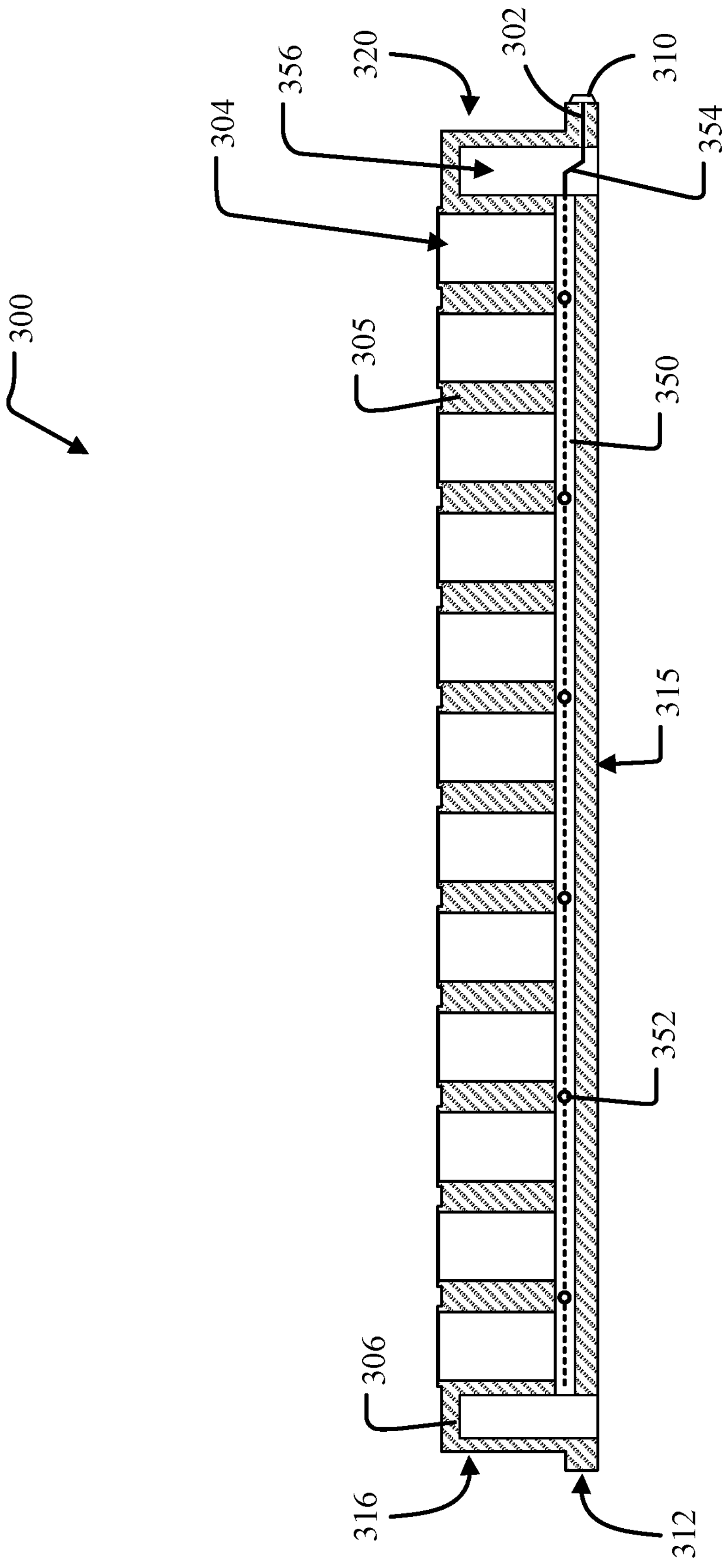
FIG. 3 depicts a section view of another example of a well plate.

FIG. 3 is a section view of another example of a well plate 300. As with the examples above, the well plate 300 includes a base or rim 302, and a body 306 that defines a plurality of wells 304. The wells 304, in this example, are substantially cylindrical and separated by solid walls 305. The base 302 is defined by a lower surface 315 above which a glass plate 350 is disposed. By raising the glass plate 350 relative to the lower surface 315, inadvertent heating of adjacent surfaces (e.g., surfaces upon which the well plate 300 rests) is reduced or eliminated. A contact 310 is disposed on the outer wall 320, specifically on the rim 302. While the outer wall 320 is depicted as solid, in other examples, the outer wall may be hollow. A conductor 354 extends from the contact 310 to the glass plate 350 and is communicatively coupled to the heat trace wires 352 disposed below the walls 305, embedded within the glass plate 350. In the depicted configuration, the conductors 352 extend directly between the contact 310 and the glass plate 350, essentially spanning a void 356 defined by the outer wall 320. Other configurations are depicted below.

The glass plate 350 may be secured within the body 306 of the well plate 300 without the use of bonding elements such as adhesives. Instead, during manufacturing, the glass plate 350 may be inserted into a mold and the plastic body 306 molded therearound to form the well plate 300. With this process, the risk of adhesive reaction and/or sample leakage between adjacent wells 304 is reduced or eliminated. Materials appropriate for the body 306 of the well plate 300 include, but are not limited to, polyimides such as polytetrafluoroethylene (PTFE), polyetheretherketone (PEEK), polyphenylen sulfide (PPS), and other materials such as nylon, acetal, and polyester. The glass plate may be manufactured of or include soda-lime, borosilicate, silicate, aluminosilicate, lead, or other material(s) that display the desired performance characteristics, e.g., as to acoustic transparency, thermal stability, and/or other properties. Heated well plates such as those disclosed herein produce more reliable kinetic data. Such a configuration allows in situ kinetics experiments to be run, thus providing more accurate data with fewer reagents and less manual manipulation, as compared to current formats that require sampling and quenching of samples at several timepoints in the reaction. Although in situ kinetic experiments can currently be performed using plate readers, other than the inherent tendency of false positives, they usually require fluorescence tags before the markers can be read and this potentially affects the reaction itself. As the heating of sample happens at the sample itself via the glass plate 350 obviates the need to heat the entire internal environment of an analysis instrument.

Coupled with acoustic dispensing, the throughput and speed of analysis of kinetic experiments can be significantly increased. Further, the technologies allow for use of non-heated well plates to run non-kinetic analyses, while kinetic experiments may be run with heated well plates, without the need to change the testing systems. Thus, the primary hardware remains unchanged, thus providing an elegant "plug and play" upgradable/downgradable option for labs having limited space.

Figure 3C:
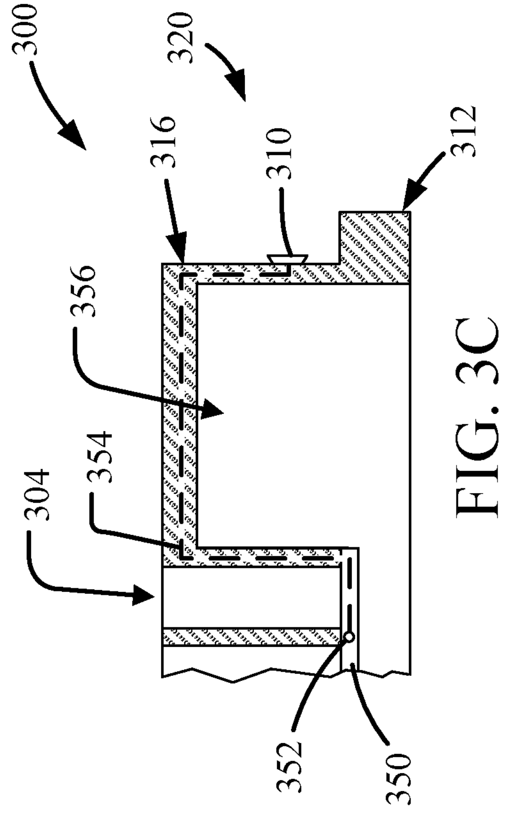
FIGS. 3A-3C depict partial section views of other examples of well plates.
Figure 3A:
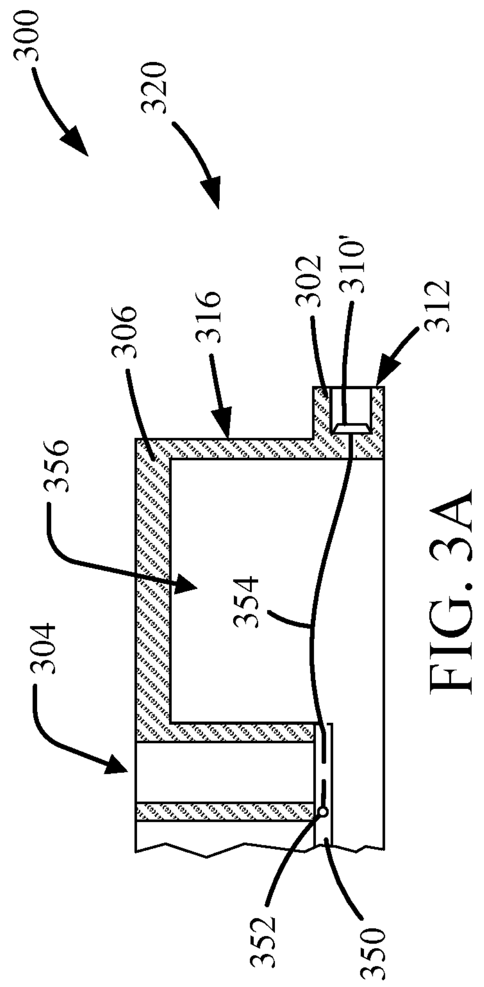
Figure 3B:
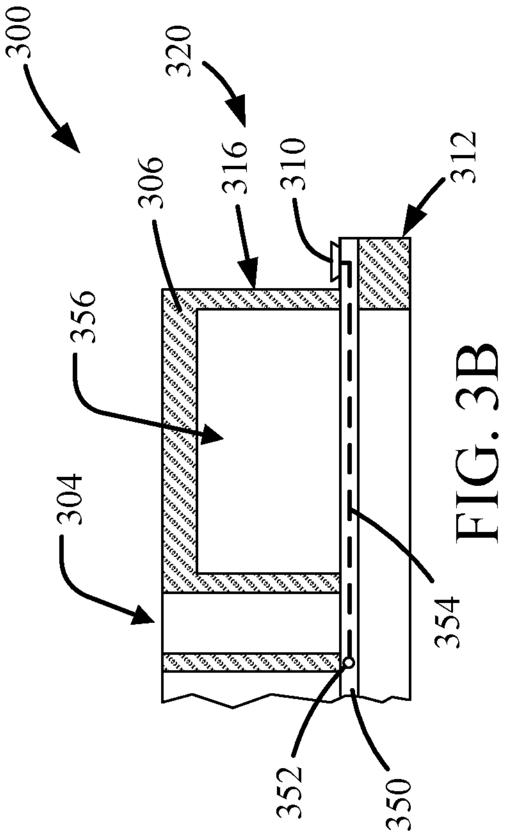

FIGS. 3A-3C depict partial section views of other examples of well plates 300. For ease of reference, the reference designators utilized are similar to those utilized in FIG. 3. In FIG. 3A, the partial section view is through an outer wall 320 of a well plate 300. As depicted above, the outer wall 320 includes a rim 302 having an end surface 312 within which a contact 310 is recessed. In alternative examples, a contact may be mounted on an end surface 316 of a body 306 of the well plate 300. Walls 305 and a glass plate 350 define each well 304. The contact 310 is connected to a conductor 354 that spans an interior void 356 defined by the outer wall 320. The conductor 354 is connected to a plurality of electrical heat trace wires 352 that are embedded in the glass plate 350. While the conductor 354 is depicted simply spanning the void 356, the conductor 354 may instead be routed closer to the structure of the outer wall 320 and well 304, so as to limit the potential for damage if multiple well plates 300 are stacked on top of each other.

In FIG. 3B, the partial section view is again through an outer wall 320 of a well plate 300. As depicted above, the outer wall 320 includes a rim 302. In this example, the glass plate 350 extends to the outer wall 320 and is at least partially exposed (thus acting as an upper surface of the rim 302). In FIG. 3B, the upper surface of the glass plate 350 is located at an interface at the end surface 316 of the body 306. A contact 310 is disposed on the exposed portion of the glass plate 350, and a conductor 354 is routed through the glass plate 350 to the plurality of heat trace wires 352 located proximate the wells 304. This configuration protects the conductor 354 from potential damage, but may increase cost of the well plate 300, e.g., by complicating manufacture.

Yet another example is depicted in FIG. 3C, which is another partial section view through an outer wall 320 of a well plate 300. Here, a contact 310 is disposed on the end surface 316 of the outer wall 320. A conductor 354 is routed through a structure of the well plate 300, in this case the outer wall 320 itself, and is connected to the plurality of heat trace wires 352 disposed in the glass plate 350. This configuration protects the conductor 354 from potential damage.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A well plate comprising:

a body comprising a plurality of well walls and an outer wall;

a glass plate disposed below the plurality of well walls so as to form a bottom of each of a plurality of wells defined by the plurality of well walls;

a plurality of electrical heat trace wires disposed on the glass plate;

a plurality of contacts disposed proximate an exterior surface of the body; and a plurality of conductors connecting the plurality of contacts to the plurality of heat trace wires.

2. The well plate of claim 1, wherein the outer wall comprises a rim.

3. The well plate of claim 1, wherein at least one of the plurality of electrical trace wires are aligned with at least one of the plurality of well walls.

4. The well plate of claim 1, wherein at least a portion of each of the plurality of conductors are embedded in the body.

5. The well plate of claim 1, wherein each of the plurality of contacts are disposed substantially flush with the body.

6. The well plate of claim 1, wherein each of the plurality of contacts are recessed within the body.

7. The well plate of claim 1, wherein the plurality of contacts are disposed on the outer wall.

8. The well plate of claim 2, wherein the plurality of contacts are disposed on the rim.

9. The well plate of claim 1, further comprising a fuse coupled to the plurality of conductors.

10. The well plate of claim 1, wherein a bottom surface of the glass plate is elevated relative to a bottom surface of the outer wall.

11. A well plate comprising:

a molded plastic body defining an outer wall of the well plate and a plurality of well walls, wherein the plurality of well walls define a plurality of sample wells;

an acoustically transparent plate defining a bottom of each of the plurality of sample wells;

a plurality of electrical trace wires embedded within the plate at a location outside the well walls;

a plurality of conductors connected to the plurality of electrical trace wires; and a contact connected to each of the plurality of conductors.

12. The well plate of claim 11, wherein the contacts are accessibly disposed on an exterior surface of the molded plastic body.

13. The well plate of claim 11, wherein the contacts are disposed on substantially opposite exterior surfaces of the molded plastic body.

14. The well plate of claim 11, wherein the plurality of conductors are at least partially embedded in the molded plastic body.

15. The well plate of claim 11, wherein the plurality of trace wires are disposed substantially parallel to each other.

16. The well plate of claim 11, wherein the plurality of trace wires are disposed substantially parallel to the outer wall of the molded plastic body.

17. The well plate of claim 11, wherein the molded plastic body is directly secured to the acoustically transparent plate.

18. The well plate of claim 11, wherein the molded plastic body is adhesively secured to the acoustically transparent plate.

19. The well plate of claim 11, wherein the plurality of electrical trace wires are substantially aligned with at least one of the plurality of well walls.

20. The well plate of claim 11, wherein the plurality of conductors are embedded in a bridge spanning from the outer wall to the acoustically transparent plate.

* * * * *